: 3,494,873
Patented Feb. 10, 1970

3,494,873
METHOD FOR MAKING CATALYST FOR LINEAR POLYMERIZATION OF OLEFINS
Friedrich Vohwinkel, Langenselbold, and Gerhard Preusser, Frankfurt am Main, Germany, assignors, by mesne assignments, to Vickers-Zimmer Aktiengesellschaft Planung und Bau Von Industrieanlagen, Frankfurt am Main, Germany, a corporation of Germany
No Drawing. Filed Jan. 17, 1966, Ser. No. 520,873
Claims priority, application Germany, Jan. 20, 1965,
Z 11,284
Int. Cl. B01j 11/78; C07c 3/10
U.S. Cl. 252—429                                           4 Claims

ABSTRACT OF THE DISCLOSURE

Method for making a catalyst component useful in the linear polymerization of olefins by reducing a titanium (IV) halide with an aromatic titanium (II)-aluminum halide complex of the formula $Ar \cdot TiX_2 \cdot Al_2X_6$ wherein Ar is an aromatic molecule and X is halogen, in a solvent, at about 15–120° C., heating the mixture for a period up to six hours at about 80–180° C., and adding to the mixture a complex former.

---

This invention relates to a process for making catalysts useful in the linear polymerization of olefinically unsaturated hydrocarbons, particularly those hydrocarbons of the general formula $CH_2=CHR$, in which R is alkyl of up to four carbons or phenyl. In particular this invention relates to a novel catalyst system for such polymerization.

It is well-known to polymerize olefines of the above-stated general formula to polymerizates of high isotactic configuration, e.g., more than 90%, in a liquid diluent in the presence of a stereospecific catalyst system consisting of two components, one component of which is a compound produced by reduction of a titanium (IV)-halide and the other component of which is an aluminum-organic compound. Isotactic polymers are those which are highly crystalline and stereoregular. They are generally well-known in the art and are especially important for plastics production.

As an example of such a stereospecific catalyst system is one already proposed by Natta, (Gaaz. Chim. Ital. 87 (1957), fasc. V, pages 528, 549, 570 and J. Polym. Sci. 51 (1961) page 396) which comprises a mixture of aluminum triethyl and $TiCl_3$ wherein the $TiCl_3$ is produced by reduction of $TiCl_4$ with hydrogen or aluminum at high reaction temperatures. This reduction is difficult to effect and, furthermore, the $TiCl_3$ resulting therefrom generally is in coarse crystalline form which results in low polymerization rates of reaction.

Further, it is well-known (Natta, loc. cit., as well as German Patents 1,109,894, 1,109,895 and 1,110,418) to produce solid, titanium-containing components for stereospecific catalyst systems by reduction of $TiCl_4$ with aluminum-organic compounds or halogen-containing aluminum-organic compounds. This procedure avoids the high reaction temperatures necessary in the reduction of $TiCl_4$ with hydrogen or aluminum, but it has other disadvantages. The reduction must be effected within carefully controlled temperature ranges. Moreover, valuable organic-metallic substances are lost in the reduction and are no longer useful for the polymerization process. A further drawback is due to the fact that in the use of halogen-containing aluminum-alkyl compounds, aluminum alkyl dihalides arise according to the reaction.

$$TiCl_4 + AlR_2X = TiCl_3 + AlRXCl + R$$

(R=alkyl and X=halogen). It has been found that part of the aluminum alkyl dihalides are bound to the $TiCl_3$ in the form of complex compounds so that even careful washing of the $TiCl_3$ deposit with inert solvents will not completely remove the undesired by-products.

With the present invention, however, the drawbacks of stereospecific catalyst systems as above described are avoided. This is achieved according to our invention by use of a titanium-containing catalyst component obtained by reduction of a titanium (IV) halide at 15° to 120° C. with equimolar amounts of an aromatic-titanium (II)-aluminum halide complex of the general formula $Ar \cdot TiX_2Al_2X_6$ in which Ar represents an aromatic molecule and X a halogen atom, then thermally treating the resultant mixture at temperatures of 80° C. to 180° C. The product is then treated with complex formers, preferably ethers or alkali- or alkaline-earth metal halides.

By using a titanium-containing catalyst component produced as outlined above in conjunction with an aluminum-organic compound serving as activator, we obtain an unexpectedly good catalyst system which fulfills the requirement for a high polymer yield with high isotacticity index. In addition, we achieve a number of other advantages over the catalyst systems known hitherto. For example, it is possible to carry out the reduction of the titanium (IV) halide to titanium (III) halide quantitatively under mild reaction conditions.

Further, the aromatc complexes used, i.e., the $$Ar \cdot TiX_2Al_2X_6$$

complexes, are easily producible by reaction of titanium (IV) halide with metals, for example aluminum, in the presence of aluminum halides and an aromatic hydrocarbon, such as, for example, benzene, toluene or the like. All the starting products, especially the metal chlorides, are economical and readily obtainable commercially. Further, the aromatic complexes are more easily handled than aluminum-organic compounds since they are neither self-igniting nor explosively reactive with water.

Another special advantage is that in the reduction of titanium (IV), no valuable organic-metallic compounds are lost and no harmful by-products are produced, such as, for example, aluminum alkyl-dihalides. Although precipitated aluminum halide remains in the process according to our invention after the thermal treatment and after the addition of complex formers, it is present in only slight concentration in the catalyst component and does not interfere with polymerization. The same observation was made by Natta (J. Polym. Sci. 51 (1961), pp. 394–395) in research with $AlCl_3$-containing titanium catalysts.

The titanium (IV) reduction according to our invention is done preferably in aromatic solvents, in which both the aromatic complexes and the titanium (IV) halides are soluble. Besides aromatic solvents, aliphatic hydrocarbons may also be used in which case somewhat longer reaction times are necessary for complete conversion due to insolubility of the aromatic components in saturated hydrocarbons.

As representative of aromatic complexes useful in our invention, there are for example, the following materials:

Toluene.$TiCl_2$.$Al_2Cl_6$ complex
Benzene.$TiBr_2$.$Al_2Br_6$ complex
Mesitylene.$TiI_2$.$Al_2I_6$ complex, and in particular
Benzene.$TiCl_2$.$Al_2Cl_6$ complex As titanium (IV) halides, $TiBr_4$, $TiI_4$ and $TiCl_4$ are preferable.

According to the reaction equation $$Ar.TiX_2.Al_2X_6 + TiX_4 \rightarrow 2TiX_3 + 2AlX_3 + Ar$$

equimolar amounts of the reactants are used. The reaction proceeds practically quantitatively, it being possible to proceed in such a way that one of the two reactants is initially placed in the reactive vessel and the other sluiced in or, alternatively, both reactants are simultaneously sluiced into the reaction vessel. The reduced titanium compound drops out immediately on addition of the soluble reactant if the process is effected in aromatic solvents. The reduction can be carried out in a broad temperature range. It is, in particular, not necessary to operate at temperatures lower than room temperature, as is often required in the reduction of $TiCl_4$ with aluminum-organic compounds. (See, for example, German Patents 1,109,894, 1,109,895 and 1,110,412.)

The thermal treatment can take place after or during the initial reaction. In the latter case, the reduction is carried out advantageously at temperatures in the upper range of the given temperature limits and the temperature is preferably raised still further after addition of the reactants. It is also possible, however, to carry out the reduction in the low-boiling aromatic solvents, such as benzene or toluene, and after addition of a considerably higher-boiling, saturated hydrocarbon, to distill off the aromatic solvent. This procedure is specially advantageous when it is desired to use such high-boiling saturated hydrocarbons as diluting agent in the polymerization. The hydrocarbon distilled off can be reused without further purification for the production of the aromatic complexes.

Duration and temperature of thermal treatment are interdependent. A relatively short thermal treatment at a higher temperature leads to similar results to those of a longer thermal treatment at lower temperatures. The thermal treatment is carried out in a temperature range of 80° C. to 180° C., preferably 110° C. to 160° C.

The catalysts of our invention can be still further raised in their efficiency by addition of complex formers. Suitable complex formers are, for example, halides of metals of the 1st and 2nd main groups of the periodic system, such as NaCl or $CaCl_2$, and, further, aliphatic, araliphatic or aromatic ethers, such as diethyl ether, methyl phenyl ether or diphenyl ether. The molar ratio of titanium compound to complex formers may vary within wide limits, as, for example, between 1:0.1 to 1:5. The ratio is governed by the $AlCl_3$ concentration still present in the titanium catalyst. A ratio of 1:0.5 to 1:3 is advantageous. The addition of alkali or alkaline-earth metal halides is preferably done before or during thermal treatment. The ethers, on the other hand, are preferably added only after thermal treatment.

As aluminum-organic compounds which form the second component, i.e., the activator component of the catalyst system we have found to be particularly useful dialkyl aluminum halides, trialkyl aluminum compounds or mixtures of the two. Particular compounds are, diethyl aluminum chloride and triethyl aluminum. In general we prefer to use 0.5 to 4 moles of aluminum-organic compounds to 1 mole of titanium compound.

The polymerization conditions employed are those conventionally used in the low-pressure polymerization of olefines. It is possible to work at normal pressure or at slightly raised pressures, as, for example, between 1 and 20 atmospheres excess pressure. The polymerization temperature depends on the monomer used; temperatures between 20° C. and 100° C. are preferred. The polymerizates obtained can be worked up in the known manner.

EXAMPLE 1

Production of the titanium-containing catalyst component

In a 2-liter four-necked flask, exhausted of air and moisture, 46.4 gms. (0.1) of the crystalline complex (Benzene.$TiCl_2$.$Al_2Cl_6$) were dissolved in 500 cc. of air-free and dry benzene. At room temperature there was added to the flask under agitation 18.97 gms. (0.1 mole) of $TiCl_4$ over a period of 15 minutes. A fine brown deposit was precipitated. Agitation was continued for 15 minutes more, then the flask was heated to 80° C. 800 cc. of olefine-free diesel oil fraction having a boiling point of 200° to 250° C. were then added. The benzene was thereafter distilled off. After addition of 11.7 fims. (0.2 mole) of dry, air-free and finely powdered sodium chloride, the suspension was further heated under good agitation for three more hours to 160° C.

Polymerization of propylene

In a 1-liter glass autoclave equipped with agitator, gas compartment, thermometer and heating jacket there was placed 600 cc. of air-free heptane as diluent, 0.965 gms. (8 mmol) of diethyl aluminum chloride as activator component and 0.616 gms. (4 mmol) of the titanium compound produced as above described. After heating to 50° C., 100 g. of propylene was introduced under good agitation. Polymerization started immediately and polymerization temperature was maintained at 50° C. by cooling. After 4 hours reaction time, the polymerization was terminated by addition of 40 cc. butanol, the mixture thoroughly agitated three times with 1 in each case, 200 cc. of water the suspension drawn off on a suction filter and the residue washed three times on the suction filter with warm heptane. The product was dried in a vacuum at 70° C. Yield was 76.0 gms. of polypropylene with a reduced viscosity (0.5% solution in tetralin at 130° C.) of 7.6. The space-time yield amounted to 51.4 gms. of polypropylene per gram of titanium compound per hour per liter of diluent. A sample of the polymerizate was extracted for 24 hours with boiling heptane. 96.8% of the polymerizate remained undissolved.

EXAMPLE 2

Production of the titanium-containing catalyst component

In a 2-liter four-necked flask, exhausted of air and moisture, a solution of 47.8 gms. (0.1 mole) of the complex (Toluene.$TiCl_2$.$Al_2Cl_6$) was heated to 80° C. in 500 cc. of toluene. Under good agitation there was added to the flask 18.97 gms. (0.1 mole) of $TiCl_4$ over a period of 15 minutes. 800 cc. of an olefine-free diesel oil fraction of a boiling point of 200° to 250° C. were then added and the toluene was distilled off. Heating was continued for 3 more hours at 140° C. followed by cooling. The resultant deposit was filtered off over a glass frit. On the glass frit, the deposit was briefly washed with a solution of 33.3 gms. (0.45 mole) of diethyl ether in 200 cc. of toluene rewashed once with 100 cc. of toluene and then three times with 100 cc. each time of the diesel oil fraction. The deposit was finally washed from the frit as a suspension in the diesel oil fraction.

Polymerization of propylene

In a 3-liter agitation vessel with agitator, gas feed and gas compartment there was placed under nitrogen 2.1 liters of a well-dried and air-free diesel oil fraction ot the boiling range 200° to 220° C. as diluent and 3.62 gms. (30 mmol) of diethyl aluminum chloride as activator component. 3.08 gms. (20 mmol) of the titanium compound produced as above described was added at 50° C. Propylene was introduced to the extent that it was absorbed by the reaction mixture. The polymerization started immediately. The polymerization temperature was maintained at 50° C. by cooling. After 5 hours the polymerization was terminated by addition of 80 cc. of butanol, the mixture thoroughly agitated three times with, in each case, 500 cc. of water, the suspension drawn off on a suction filter and the residue washed out twice on the suction filter with warm dispersing agent. The dispersing agent was then removed by steam distillation. The product was dried under vacuum at 70° C. Yield of polypropylene was 17 gms. per gm. of titanium compound per hour. A sample of the polymerizate was extracted for 24 hours with boiling heptane. As residue there remained 98% of insoluble polypropylene.

EXAMPLE 3

Production of the titanium-containing catalyst component

In the manner described in Example 2, $TiCl_4$ was reduced in toluene as diluent. Thermal treatment was effected without addition of a saturated high-boiling hydrocarbon for 6 hours at the reflux temperature of the reaction mixture. After termination of the thermal treatment, the mixture was cooled and 34 gms. (0.2 mole) of diphenyl ether were added. The flask was agitated for 30 minutes followed by filtering and washing, once with 100 cc. of toluene and twice with 100 cc. portions of heptane. The deposit was then suspended in heptane.

Polymerization of butene-1

Polymerization was effected in the manner described in Example 1, the only difference being that instead of propylene, 200 cc. of liquid butene-1 was continuously added under pressure for 90 minutes. Polymerization temperature was maintained at 40° C. for 5 hours. The working up and drying were carried out by conventional technique. There resulted 102 gms. of polymerizate with a reduced viscosity of 7.5 (measured in 0.1% solution in tetralin at 130° C.). A sample of the polymerizate was extracted for 24 hours with boiling heptane. 92% of the sample remained as insoluble residue.

We claim:

1. In a process for making catalysts useful in the linear polymerization of olefinically unsaturated hydrocarbons of the general formula $CH_2=CHR$, wherein R is an alkyl radical containing up to four carbon atoms, said catalyst consisting essentially of (1) an aluminum-organic compound selected from the group consisting of trialkyl aluminum and dialkyl aluminum halides and mixtures thereof, and (2) a titanium trihalide-containing composition, the improvement which comprises: preparing said titanium trihalide-containing composition by reducing a titanium (IV) halide with about an equimolar amount of an aromatic titanium (II)-aluminum halide complex of the formula $Ar.TiX_2 \cdot Al_2X_6$ wherein Ar is an aromatic hydrocarbon molecule and X is halogen, in a solvent, at a temperature from about 15° to about 120° C., heating the resultant mixture for a period up to six hours at a temperature from about 80° to about 180° C., and adding to said mixture a complex former selected from the group consisting of a hydrocarbon ether, alkali metal halide and alkaline earth metal halide.

2. Process according to claim 1 wherein said aluminum-organic compound is present in an amount about 0.5 to about 4 moles per mole of titanium compound.

3. Process according to claim 1 wherein said complex former is present in an amount about 0.1 to 5 moles per mole of titanium compound.

4. Process according to claim 1 wherein said complex former is present in an amount about 0.5 to 3 moles per mole of titanium compound.

References Cited

UNITED STATES PATENTS

| | | |
|---|---|---|
| 3,046,264 | 7/1962 | Tornqvist et al. |
| 3,057,838 | 10/1962 | Jezl. |
| 3,075,960 | 1/1963 | Lovett et al. |
| 3,116,274 | 12/1963 | Boehm et al. |

PATRICK P. GARVIN, Primary Examiner

U.S. Cl. X.R.
260—93.5, 93.7, 94.8